United States Patent
Hecker et al.

(10) Patent No.: US 10,647,350 B2
(45) Date of Patent: May 12, 2020

(54) STEERING GEAR FOR A VEHICLE, VEHICLE, METHOD FOR CONTROLLING A STEERING GEAR AND METHOD FOR STEERING A VEHICLE

(71) Applicant: KNORR-BREMSE SYSTEME FUER NUTZFAHRZEUGE GMBH, Munich (DE)

(72) Inventors: Falk Hecker, Markgroeningen (DE); Michael Herges, Munich (DE); Christian Staahl, Munich (DE); Rainer Lang, Munich (DE)

(73) Assignee: KNORR-BREMSE SYSTEME FUER NUTZFAHRZEUGE GMBH, Munich (DE)

( * ) Notice: Subject to any disclaimer, the term of this patent is extended or adjusted under 35 U.S.C. 154(b) by 0 days.

(21) Appl. No.: 15/770,720

(22) PCT Filed: Oct. 18, 2016

(86) PCT No.: PCT/EP2016/074978
§ 371 (c)(1),
(2) Date: Apr. 24, 2018

(87) PCT Pub. No.: WO2017/071990
PCT Pub. Date: May 4, 2017

(65) Prior Publication Data
US 2019/0061812 A1    Feb. 28, 2019

(30) Foreign Application Priority Data
Oct. 27, 2015    (DE) .................. 10 2015 118 292

(51) Int. Cl.
*B62D 7/10*    (2006.01)
*B62D 1/20*    (2006.01)
(Continued)

(52) U.S. Cl.
CPC ................. *B62D 7/10* (2013.01); *B62D 1/20* (2013.01); *B62D 3/02* (2013.01); *B62D 3/08* (2013.01); *B62D 3/12* (2013.01); *B62D 5/046* (2013.01)

(58) Field of Classification Search
CPC ... B62D 7/10; B62D 1/20; B62D 3/02; B62D 3/08; B62D 3/12; B62D 5/046
See application file for complete search history.

(56) References Cited

U.S. PATENT DOCUMENTS 3,651,885 A    3/1972  Lang
3,824,905 A    7/1974  Jablonsky
(Continued)

FOREIGN PATENT DOCUMENTS

CN    1445126    10/2003
CN    103661570    3/2014
(Continued)

OTHER PUBLICATIONS

International Search Report dated Jan. 20, 2017 of the corresponding International Application PCT/EP2016/074978 filed Oct. 18, 2016.

*Primary Examiner* — Anne Marie M Boehler
*Assistant Examiner* — Marlon A Arce
(74) *Attorney, Agent, or Firm* — Norton Rose Fulbright US LLP; Gerard Messina

(57) ABSTRACT

A steering gear for a vehicle includes a linear drive having at least one displacement element, which is displaceable substantially along a vehicle longitudinal axis of the vehicle and which is fastenable to a steering drag link of the vehicle, in which the linear drive is configured to convert a rotational movement of a steering column of the vehicle into a movement of the displacement element substantially along the vehicle longitudinal axis. Also described is a related vehicle (Continued)

having the steering gear, a method for actuating the steering gear, and a method for steering the vehicle.

15 Claims, 12 Drawing Sheets

(51) Int. Cl.
*B62D 3/08* (2006.01)
*B62D 3/12* (2006.01)
*B62D 3/02* (2006.01)
*B62D 5/04* (2006.01)

(56) References Cited

U.S. PATENT DOCUMENTS

| | | | |
|---|---|---|---|
| 3,918,544 A | 11/1975 | Jablonsky et al. | |
| 4,418,781 A * | 12/1983 | Rabe | B62D 5/06 180/435 |
| 6,598,695 B1 * | 7/2003 | Menjak | B62D 5/001 180/402 |
| 8,813,901 B2 * | 8/2014 | Tashiro | B62D 5/003 180/402 |
| 2006/0278446 A1 | 12/2006 | Oxley et al. | |

FOREIGN PATENT DOCUMENTS

| | | |
|---|---|---|
| CN | 203612044 | 5/2014 |
| DE | 102005009439 | 9/2006 |
| DE | 102009056356 A1 | 6/2011 |
| DE | 102011085607 A1 | 7/2012 |
| DE | 102012213444 A1 | 2/2013 |
| EP | 1167160 A2 | 1/2002 |
| FR | 1251382 A | 1/1961 |

* cited by examiner

STEERING GEAR FOR A VEHICLE, VEHICLE, METHOD FOR CONTROLLING A STEERING GEAR AND METHOD FOR STEERING A VEHICLE

FIELD OF THE INVENTION

The present invention relates to a steering gear for a vehicle, to a vehicle, to a method for actuating a steering gear, and to a method for steering a vehicle.

BACKGROUND INFORMATION

A vehicle has a steering gear, by which a rotational movement of a steering column is converted into a movement of a steering rod coupled to a wheel for steering.

Against this background, with the approach proposed here, a steering gear for a vehicle, a vehicle, a method for actuating a steering gear for a vehicle and a method for steering a vehicle, as per the description herein, are proposed. Advantageous refinements and improvements of the device specified herein are possible by the measures specified in the further descriptions herein.

SUMMARY OF THE INVENTION

A steering gear for a vehicle is proposed, wherein the steering gear has the following feature:

a linear drive with at least one displacement element which is displaceable substantially along a vehicle longitudinal axis of the vehicle and which is fastenable to a steering drag link of the vehicle, wherein the linear drive is configured to convert a rotational movement of a steering column of the vehicle into a movement of the displacement element substantially along the vehicle longitudinal axis.

A vehicle may be understood for example to mean a motor vehicle, in particular a utility vehicle. The steering gear may for example be arranged on a frame of the vehicle and, depending on the embodiment, may be connected thereto in a fixed manner or movably in at least one direction. A linear drive may be understood to mean a drive for generating a linear movement. For example, the linear drive may be realized as a spindle drive, in particular as a ball screw drive with a recirculating ball spindle, or as a toothed-rack drive for converting a rotational movement into a linear movement. A steering drag link may be understood to mean a rod for the articulation of a wheel, which can be turned about a steering axis, of the vehicle. The wheel may for example be arranged on a rigid axle of the vehicle. The steering drag link may for example be movable substantially parallel to the vehicle longitudinal axis or parallel to a longitudinal link of the vehicle. The displacement element may for example be a toothed rack, a spindle or a spindle nut that can be screwed together with the spindle. The spindle nut may for example be configured as a recirculating ball nut. Here, the steering drag link, in particular for example an end section, facing toward the displacement element, of the steering drag link, may, depending on the embodiment, be fastened to the displacement element in a rigid manner or movably in at least one direction. It is thus possible for the displacement element and the steering drag link to be coupled to one another such that a linear movement of the displacement element is converted directly, that is to say without a further conversion of movement, for example by a steering pitman arm, into a linear movement of the steering drag link. A steering column may be understood to mean a rod-like or tubular member for mechanically coupling the steering gear to a steering wheel of the vehicle. The steering column may for example be configured as a cardan shaft.

The approach proposed here, of a steering system, in particular of a utility vehicle steering system with linear actuator, is based on the realization that a linear actuator of a vehicle steering arrangement can be configured to generate a linear movement in a longitudinal direction of the vehicle. By a direct mechanical coupling of a displacement element of the linear actuator to a steering drag link of the vehicle, the linear movement generated by the linear drive can be converted directly into a linear movement of the steering drag link. Such a combination of a linear actuator, which can for example be installed on a frame fixedly in a longitudinal direction in the vehicle, with a steering drag link offers the advantage, in particular in conjunction with an installation fixedly with respect to a frame in rigid-axle vehicles, that the number of intermediate elements and gear stages in the steering gear can be considerably reduced. Furthermore, in this way, the forces and moments acting in the steering gear can be reduced, whereby the overall play in the steering gear can be reduced, the service life of wear-afflicted parts can be increased, friction losses in the steering gear can be minimized, and costs and weight of the steering gear can be reduced.

For example, the linear actuator may be installed longitudinally with respect to a longitudinal axis of the vehicle, and connected by the steering drag link to a steering lever of a wheel. Here, the linear actuator may for example be installed on a frame beam. Owing to the connection by the steering drag link, the kinematics of a linear drive of said type are suitable in particular for rigid axles, because, with the steering drag link and a longitudinal link of an axle suspension, a parallelogram can be at least approximately formed, such that spring-compression movements of the axle do not give rise to a self-steering action.

In one embodiment, the linear drive may be realized as a toothed-racked drive with a toothed rack as displacement element. In addition, or alternatively, the linear drive may be realized as a ball screw drive with a spindle and a spindle nut. Here, either the spindle or the spindle nut may function as the displacement element. It is alternatively possible for both the spindle and the spindle nut to function as the displacement element. For example, the spindle may be configured to be displaced substantially along the vehicle longitudinal axis as a result of rotation of the spindle nut, wherein the spindle nut is positionally fixed. Conversely, the spindle nut may be configured to be displaced substantially along the vehicle longitudinal axis as a result of rotation of the spindle, wherein the spindle is positionally fixed. The toothed rack may for example be configured to mesh with a pinion arranged on the steering column. By this embodiment, the linear drive can be realized in a highly robust manner and with only a small number of moving parts.

Here, the toothed rack may be formed so as to receive the spindle and to be displaced substantially along the vehicle longitudinal axis as a result of a rotational movement of the spindle. For this purpose, the toothed rack may have a recess for receiving the spindle. The spindle may be capable of being screwed together with the recess. In particular, the toothed rack may be formed here as a recirculating ball nut, such that a rotational movement of the spindle generates a linear relative movement between the toothed rack and the spindle. Here, the spindle may be arranged positionally fixedly in the steering gear. The spindle may for example be configured to be mechanically coupled to a drive unit, for example an electric motor. By this embodiment, a twofold drive of the toothed rack, on the one hand by the steering column and on the other hand by the spindle, is made possible.

It is advantageous if the steering gear has a transmission gearing for converting the rotational movement of the steering column into a rotational movement of the spindle and, additionally or alternatively, of the spindle nut. In this way, a rotation of the steering column toward the spindle or spindle nut can be increased.

The transmission gearing may advantageously be realized as a spur-wheel gearing or bevel-wheel gearing. The spur-wheel gearing or bevel-wheel gearing may for example be a single-stage gearing. By this embodiment, the transmission gearing can be produced inexpensively. Furthermore, in this way, friction losses can be reduced.

In a further embodiment, the steering gear may have at least one drive unit for driving the displacement element. The drive unit may for example be an electric motor, for example in the form of a steering servo. In this way, an expenditure of force for rotating the steering column can be reduced.

It is advantageous here if the drive unit and the displacement element are coupled to one another by at least one toothed belt or one spur wheel or one internally-toothed wheel, or a combination of at least two of the three stated elements. This embodiment permits a transmission of force between the drive unit and the displacement element with low losses and with little wear.

In a further embodiment, the steering gear may be realized with the steering drag link. In this way, the steering drag link can be acted on with a force required for the steering action.

In a further embodiment, the steering drag link and the displacement element may be arranged coaxially with respect to one another. Here, the steering drag link and the displacement element may be rigidly connected to one another. In this way, the number of moving parts in the steering gear can be reduced to a minimum. For example, the steering gear may in this case be arranged pivotably in the vehicle.

It is advantageous if the steering drag link is connected pivotably to the displacement element by a joint. The joint may for example be a ball joint. In this way, the steering gear can be installed fixedly in the vehicle.

The approach proposed here furthermore provides a vehicle having the following features:

a steering column;
a steering drag link; and
a steering gear according to one of the above embodiments, which is coupled to the steering column and to the steering drag link.

In one embodiment, the steering gear may be arranged on a frame of the vehicle. For example, the steering gear may be fastened to a frame beam. Here, depending on the embodiment, the steering gear may be installed fixedly or pivotably on the frame. In this way, the installation of the steering gear can be simplified.

In a further embodiment, the steering drag link may be arranged so as to span a parallelogram with a longitudinal link of the vehicle during the displacement of the displacement element. A longitudinal link may be understood to mean a member for supporting a rigid axle of the vehicle in the direction of the vehicle longitudinal axis. In the case of axles with leaf springs, it is also possible for the front part of the leaf spring to serve as a longitudinal link. By this embodiment, self-steering during spring-compression movements of the rigid axle can be prevented.

Furthermore, the approach described here provides a method for actuating a steering gear according to one of the above embodiments, wherein the method comprises the following steps:

reading in a steering signal that represents a steering movement; and providing a control signal for controlling a drive unit for driving the displacement element using the steering signal.

The steering signal may for example be a signal provided by a steering moment sensor for detecting a steering moment. Correspondingly, the control signal may be provided for controlling a rotational speed or a torque of the drive unit in a manner dependent on the steering moment.

Finally, the approach proposed here provides a method for steering a vehicle having a steering column, having a steering drag link and having a steering gear coupled to the steering column and to the steering drag link, wherein the steering gear has a linear drive with at least one displacement element which is displaceable substantially along a vehicle longitudinal axis of the vehicle and which is fastenable to the steering drag link, wherein the method comprises the following steps:

coupling a steering moment into the steering gear via the steering column; and converting the steering moment into a movement of the displacement element substantially along the vehicle longitudinal axis by the linear drive.

Exemplary embodiments of the invention are illustrated in the drawings and will be discussed in more detail in the following description.

DETAILED DESCRIPTION

In the following description of expedient exemplary embodiments of the present invention, elements of similar action that are illustrated in the various figures are denoted by the same or similar reference designations, wherein a repeated description of such elements will be omitted.

Figure 1:
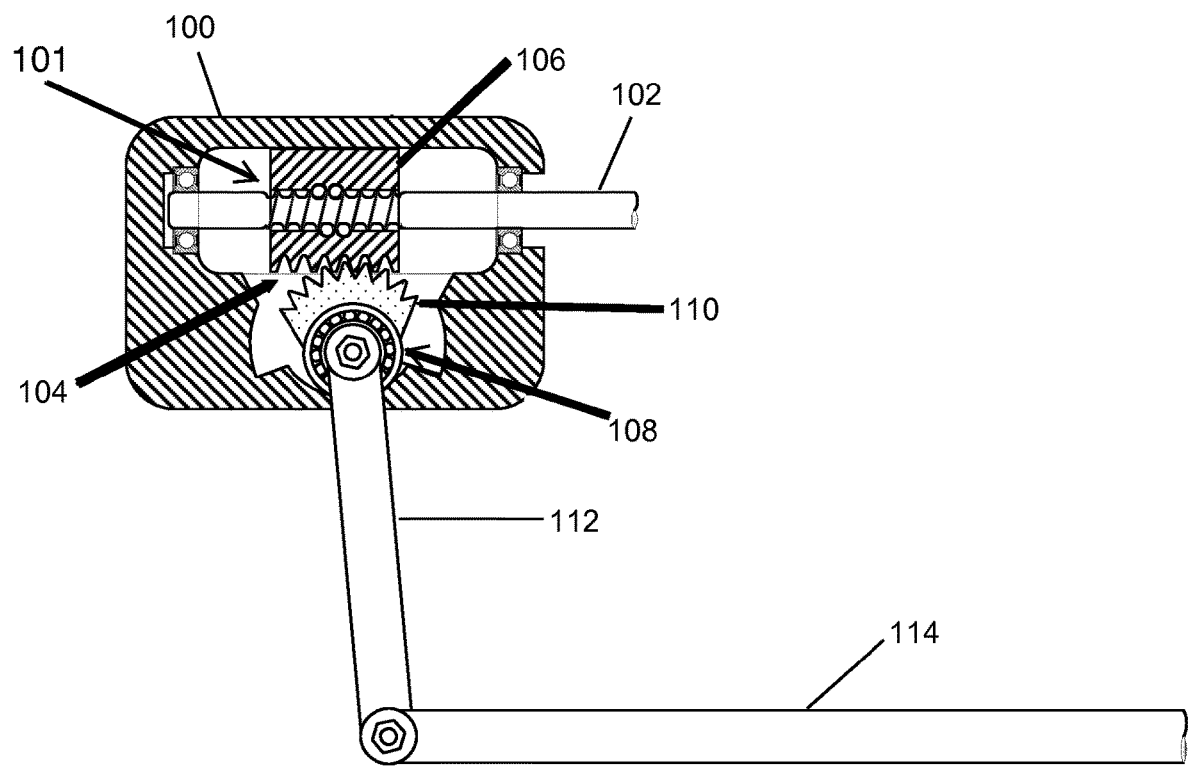
FIG. 1 is a schematic illustration of a steering gear.

FIG. 1 is a schematic illustration of a steering gear 100. The steering gear 100 comprises an input shaft 102 which is formed in sections as a spindle 101, a recirculating ball nut 106 which is arranged in the region of the spindle 101 and which has an external toothing 104, a segmented toothing 110 which meshes with the external toothing 104 and which is arranged rotationally conjointly on an output shaft 108, and a steering pitman arm 112 which is connected rotationally conjointly to the output shaft 108 and which is connected movably to a steering drag link 114.

Modern utility vehicle steering arrangements generally comprise recirculating-ball-type steering gears. The kinematics of such an arrangement are particularly expedient for utility vehicles, because these normally have a front axle in the form of a rigid axle. If the longitudinal links of the front axle and the steering drag link are of approximately equal length and arranged substantially parallel to one another, they form a parallelogram. In this way, spring-compression movements of the front axle have no effect or scarcely any effect.

If the steering gear is installed fixedly with respect to a frame, length compensation in the steering column may be realized for example owing to a corresponding relative movement between a frame of the vehicle and a drivers' cab.

In the steering gear 100 shown in FIG. 1, the rotation of a steering wheel is transmitted via the steering column and the input shaft 102, which may for example be part of the steering column, to a recirculating ball spindle 101. This rotational movement is converted by the recirculating ball nut 106 into a linear movement.

The steering gear 100 may optionally have a hydraulic servo assistance arrangement. Here, the recirculating ball nut 106 may be sealed off with respect to a housing of the steering gear 100. The recirculating ball nut 106 can thus function as a hydraulic piston. By the steering moment introduced into the input shaft 102 by the driver, it is for example possible by a rotary slide valve for a pressure difference to be built up between the two sides of the recirculating ball nut 106. The movement of the recirculating ball nut 106 can be assisted by the pressure difference.

Figure 2:
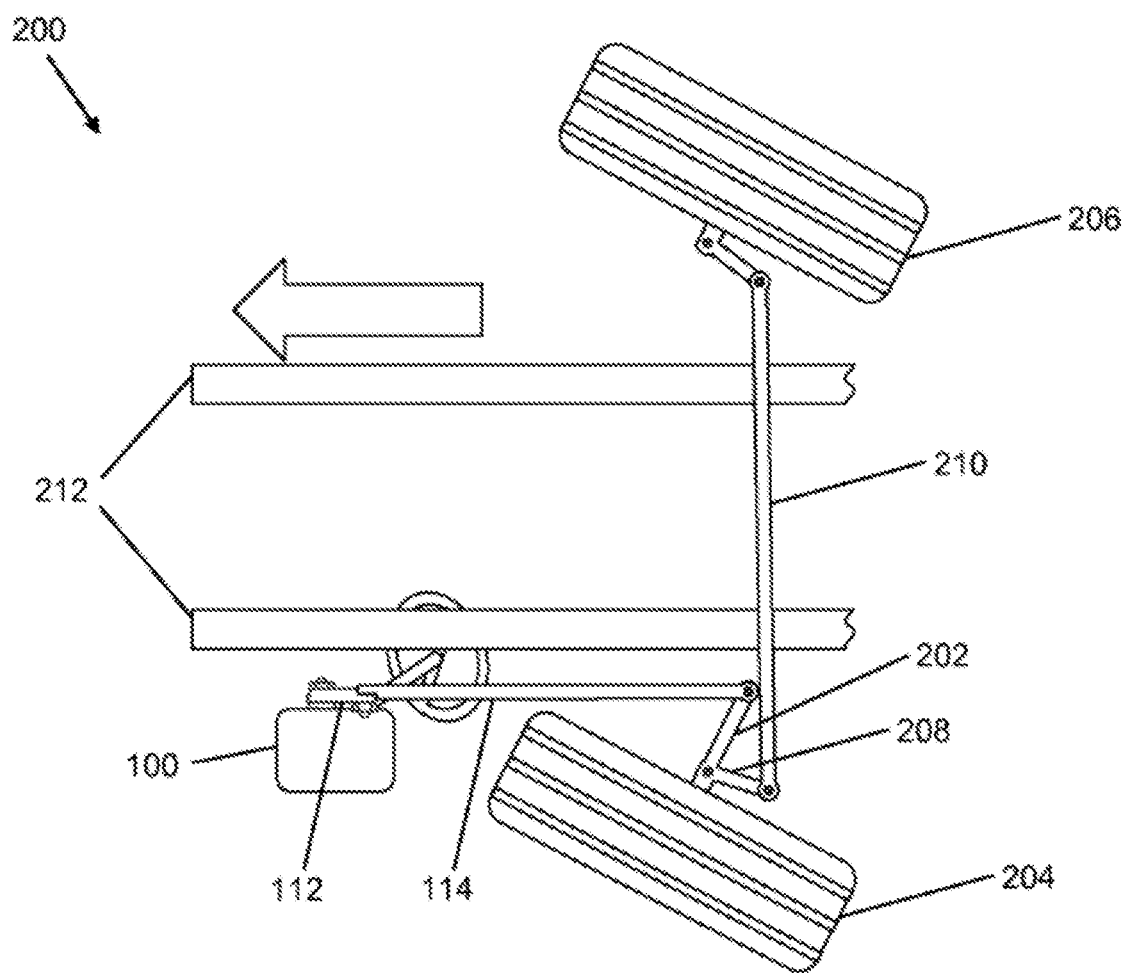
FIG. 2 is a schematic illustration of a vehicle having a steering gear from FIG. 1.

FIG. 2 is a schematic illustration of a vehicle 200 with a steering gear 100 from FIG. 1. The recirculating ball nut has, for example, a longitudinal toothing as an external toothing, in which, in turn, the segmented toothing meshes. Thus, the linear movement is in turn converted into a rotation of the steering pitman arm 112. At the end of the steering pitman arm 112, the steering drag link 114 is in turn moved predominately linearly. By the steering drag link 114, the wheel 204 for steering is ultimately pivoted about the steering axis by a steering lever 202 fastened to the wheel carrier. Here, a further wheel 206 situated opposite the wheel 204 may be steered jointly by a knuckle arm 208 and a rigid tie rod 210. Also illustrated is a vehicle frame 212 in the form of two frame beams which are arranged parallel to one another. A direction of travel of the vehicle is denoted by an arrow.

Since an effective radius of the segmented toothing may be approximately one quarter to one third smaller than an effective length of the steering pitman arm 112, a force should be transmitted at the toothing between recirculating ball nut and segmented toothing which is several times higher than that which would be required for actuating the steering drag link 114. That is to say, the steering gear 100 should be of a correspondingly solid and heavy configuration, which can lead to high production costs and a high level of wear. The multiplicity of transmission elements required can result in relatively low efficiency and a high level of hysteresis owing to the friction-afflicted connecting points. Since the play between individual moving parts adds up, the steering play can in particular increase over the service life.

It would for example be possible for the spindle to be driven by an electromotive actuator. Here, the forces acting on the recirculating ball nut, which forces are applied predominantly by the hydraulics in the case of a conventional steering assistance arrangement, could subject the balls and, axially, the spindle to high load, which would necessitate a correspondingly strong configuration of the steering gear 100. It would alternatively be possible for the electromotive actuator to act directly on the output shaft. This would however necessitate a multi-stage gearing between actuator and output shaft, which could lead to high costs, reduced efficiency, noises and vibrations and increased play.

By contrast to utility vehicles, in passenger motor vehicles, use is normally made of a linear actuator in the form of a toothed-rack steering arrangement installed on the axle body transversely with respect to the direction of travel. Here, the rotational movement of the steering column is converted by a pinion directly into a longitudinal movement of the toothed rack. The toothed rack is seated transversely between the front wheels and, via tie rods, acts directly on the knuckle arms fixed to the wheel carriers, which knuckle arms pivot the wheels. Owing to the small number of transmission parts, this arrangement is rigid, lightweight and exhibits little play. To avoid an undesired self-steering action, in particular changes in toe-in and toe-out, during spring-compression and extension movements, it would however be necessary for the toothed-rack steering gear to be fastened directly to the axle. Since it is however the case in heavy utility vehicles that the axle is a jointly suspended rigid axle, a large amount of length compensation of the steering column would be necessary.

Furthermore, it would be necessary for the steering column to be led between the wheels to the axle, which could however lead to space problems in the case of a utility vehicle, in which the engine and gearbox are generally installed between the steering wheel and axle. Furthermore, the steering gear 100 would thus be part of the unsprung mass, and would be subject to correspondingly intense vibrations.

Figure 3:
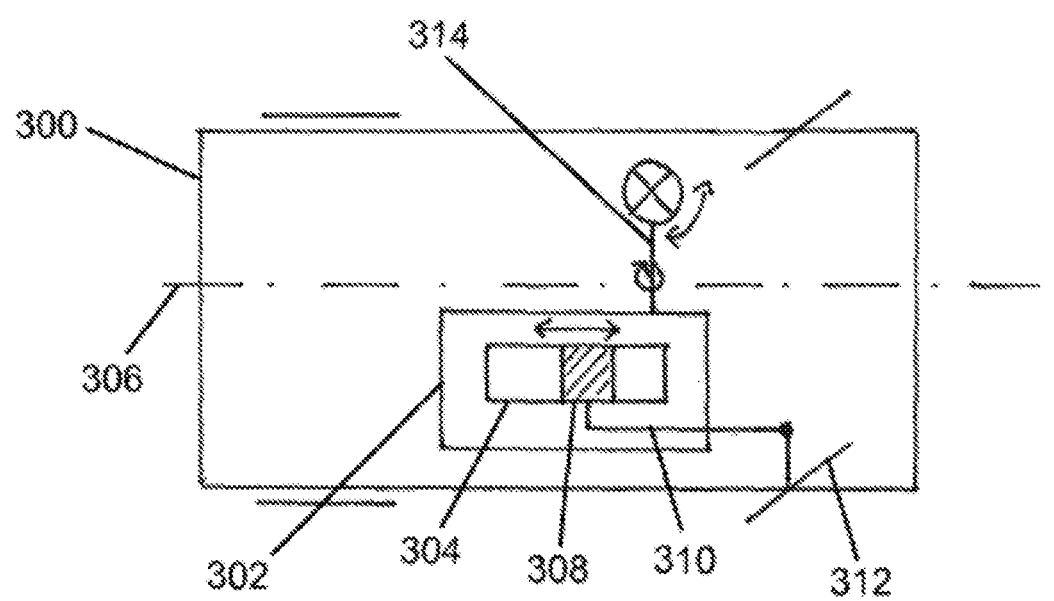
FIG. 3 is a schematic illustration of a vehicle as per an exemplary embodiment.

FIG. 3 is a schematic illustration of a vehicle 300 as per an exemplary embodiment. The vehicle 300 is equipped with a steering gear 302 which comprises a linear drive 304 with a displacement element 308 which is displaceable along a vehicle longitudinal axis 306 of the vehicle 300. A steering drag link 310 for the articulation of a wheel 312 is fastened to the displacement element 308. The linear drive 304 is configured to convert a rotational movement of a steering column 314 into a linear movement of the displacement element 308 along the vehicle longitudinal axis 306, such that the steering drag link 310 is likewise displaced, and the wheel 312 is correspondingly deflected. In one exemplary embodiment, the steering drag link 310 is connected directly to the displacement element 308. Therefore, no lever element is necessary to transmit the movement of the displacement element 308 to the steering drag link 310; instead, the movement of the displacement element 308 is transmitted directly to the steering drag link 310. Here, a surface of the steering drag link 310 may be in direct contact with a surface of the displacement element 308.

Figure 4:
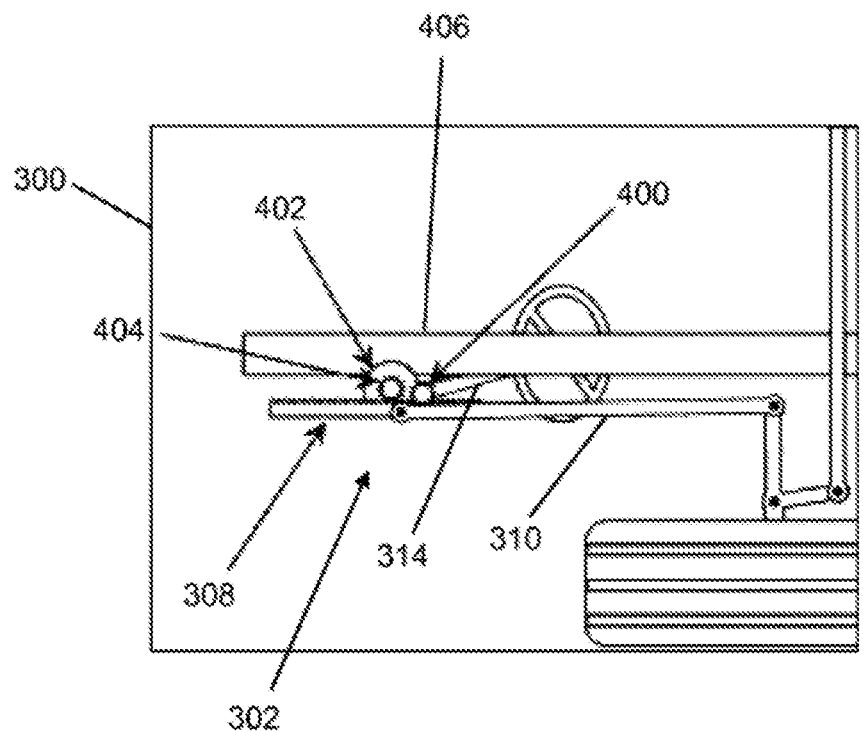
FIG. 4 is a schematic illustration of a section of a vehicle as per an exemplary embodiment.

FIG. 4 is a schematic illustration of a section of a vehicle 300 as per an exemplary embodiment. The vehicle 300 is for example a vehicle as described above on the basis of FIG. 3. In this exemplary embodiment, the displacement element 308 is configured as a toothed rack. Here, the steering column 314 is for example connected to a pinion 400, which meshes directly with the displacement element 308. An end section of the steering drag link 310 is connected to the displacement element 308 in the form of the toothed rack, such that the steering drag link 310 is moved by the displacement element 308. In one exemplary embodiment, the steering drag link 310 and the displacement element 308 are movably connected to one another by a single rigid connecting element, for example in the form of a pin or a bolt, by which a linear movement of the displacement element 308 is transmitted directly to the steering drag link 310.

Optionally, the vehicle 300 has an electric servo assistance arrangement which, for example as per the exemplary embodiment shown in FIG. 4, comprises an electric motor as drive unit 402. The drive unit 402 is configured to drive at least one drive element 404, in this case a drive pinion, which meshes with the displacement element 308. Alternatively, the drive unit 402 is configured to engage on the steering column 314 and impart an assistance moment there.

In one exemplary embodiment, the steering gear 302 is fastened to a frame 406 of the vehicle 300, for example to a frame beam.

Figure 5:
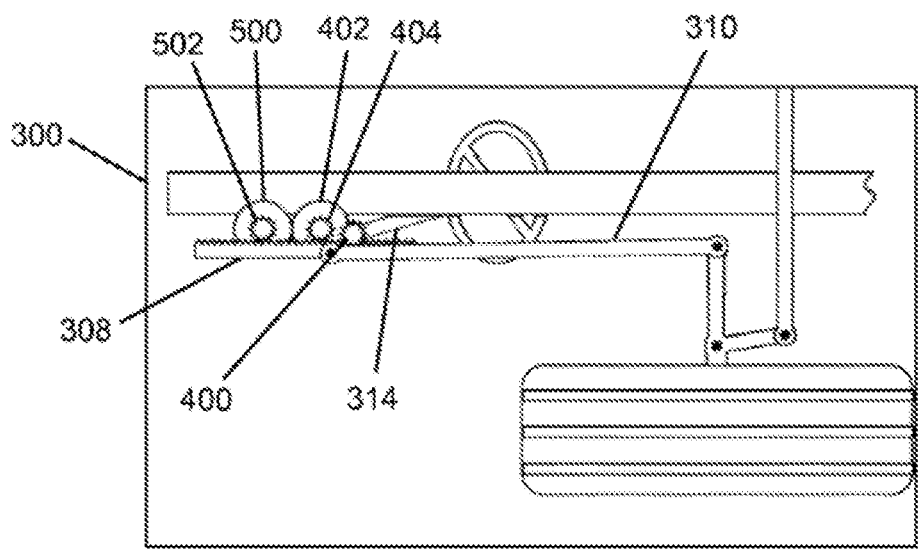
FIG. 5 is a schematic illustration of a section of a vehicle as per an exemplary embodiment.

FIG. 5 shows a section of a vehicle 300 as per an exemplary embodiment. By contrast to FIG. 4, the vehicle 300 shown in FIG. 5 has a further drive unit 500, which is configured to drive the displacement element 308, which is realized as a toothed rack, by at least one further drive element 502, in this case likewise a further drive pinion, which meshes with the displacement element 308. Here, the two drive elements 404, 502 engage into one and the same toothing side of the displacement element 308.

Figure 6:
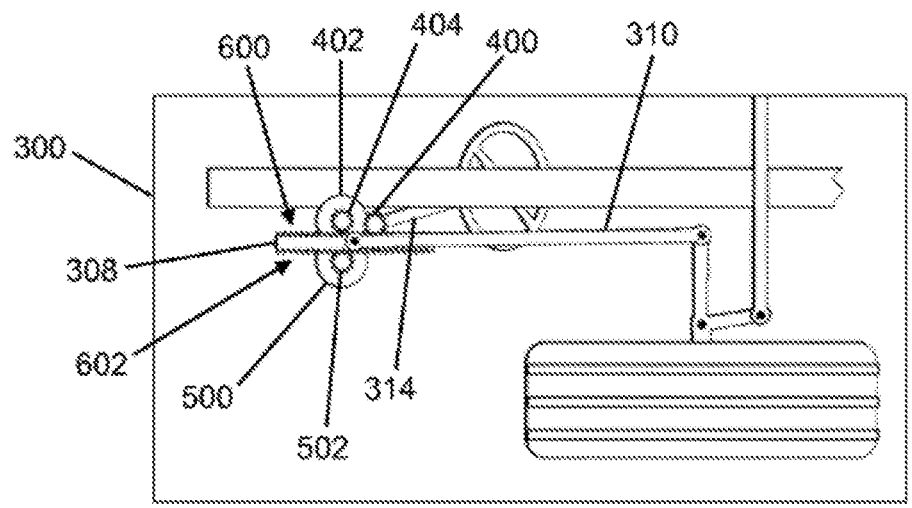
FIG. 6 is a schematic illustration of a section of a vehicle as per an exemplary embodiment.

FIG. 6 shows a section of a vehicle 300 as per an exemplary embodiment. By contrast to the vehicle shown in FIG. 5, the displacement element 308 is, in this exemplary embodiment, arranged between the drive element 404 and the further drive element 502. Here, the pinion 400 and the drive element 404 mesh with a first toothing side 600 of the displacement element 308. By contrast, the further drive element 502 meshes with a second toothing side 602, situated opposite the first toothing side 600, of the displacement element 308.

In a further exemplary embodiment, the linear drive of the steering gear is realized as a spindle drive, in particular as a recirculating-ball-type spindle drive, for moving the steering drag link, as will be described in more detail below on the basis of FIGS. 7 to 17.

Figure 7:
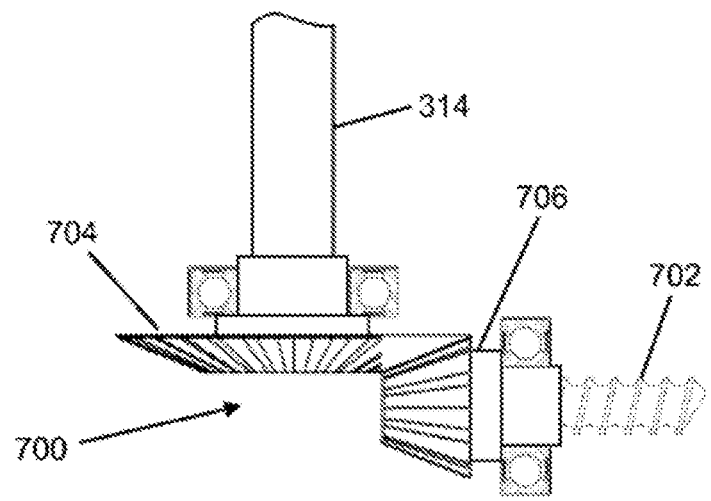
FIG. 7 is a schematic illustration of a transmission gearing as per an exemplary embodiment.

FIG. 7 is a schematic illustration of a transmission gearing 700 as per an exemplary embodiment. The transmission gearing 700 is configured to convert a rotation of an input shaft of the steering column 314 into a rotation of a spindle 702 of the linear drive. In this exemplary embodiment, the transmission gearing 700 is configured as a single-stage bevel-wheel gearing with a first bevel wheel 704 fastened to an end of the steering column 314 and with a second bevel wheel 706 which meshes with the first bevel wheel 704 and which is fastened to an end of the spindle 702. By way of example, the first bevel wheel 704 has a greater number of teeth than the second bevel wheel 706. Thus, a rotation of the steering column 314 is increased in the direction of the spindle 702 by a transmission ratio predefined by the two bevel wheels 704, 706.

The transmission gearing 700 may alternatively be realized as a single-stage spur-wheel gearing.

Figure 8:
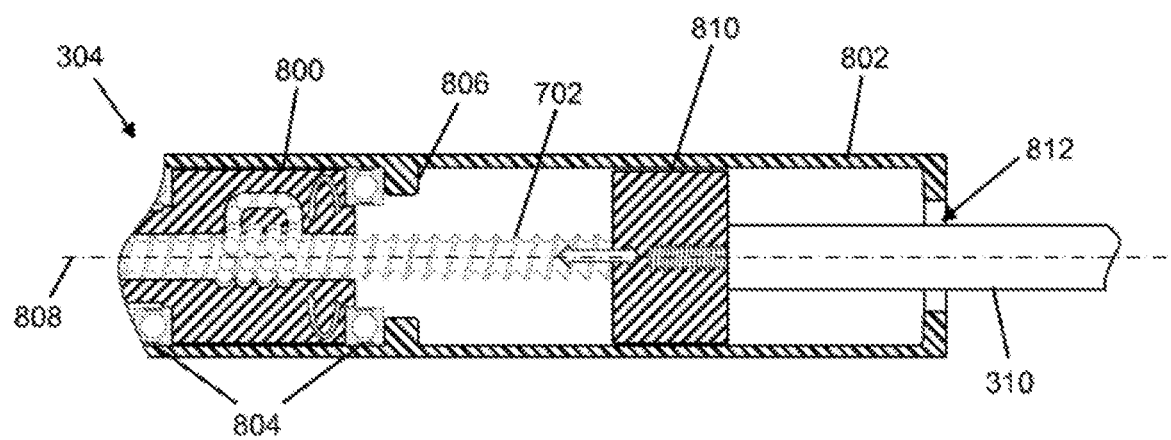
FIG. 8 is a schematic illustration of a linear drive as per an exemplary embodiment.

FIG. 8 is a schematic illustration of a linear drive 304 as per an exemplary embodiment. The linear drive 304 is for example a linear drive described above on the basis of FIGS. 3 to 7. In this exemplary embodiment, the linear drive 304 is realized as a recirculating-ball-type spindle drive with a recirculating ball nut as spindle nut 800, and with the spindle 702 mounted rotatably in the spindle nut 800. The spindle 702 and the spindle nut 800 are arranged in a spindle drive housing 802. Here, the spindle nut 800 is mounted rotatably in the spindle drive housing 802 by two spindle nut bearings 804, in this case rolling bearings. The spindle drive housing 802 is formed with a stop 806 which serves for fixing the spindle nut 800 in the direction of an axis of rotation 808 of the spindle nut 800, such that the spindle 702 moves linearly along the axis of rotation 808 in the event of rotation of the spindle nut 800. For this purpose, the spindle nut 800 is for example coupled by the transmission gearing (not shown here) to the steering column. The spindle 702 thus functions as displacement element.

In the exemplary embodiment shown in FIG. 8, the spindle 702 has, on a spindle end averted from the transmission gearing, a guide element 810, for example in the form of a disk, which is displaceable in the spindle drive housing 802 along the axis of rotation 808. An end of the steering drag link 310, which is arranged coaxially with respect to the spindle 702, is rigidly fastened, for example by screw connection, to the guide element 810. Here, the steering drag link 310 is led through a housing opening 812 in the spindle drive housing 802. The guide element 810 may likewise be regarded as displacement element.

The steering drag link 310 is thus coupled to the steering gear coaxially and in pivotably and rotationally fixed fashion. Here, the steering gear may be connected pivotably at one point to the frame of the vehicle. Owing to the coaxial articulation of the steering drag link 310 together with a pivotable mounting of the steering gear, it is possible to avoid a situation in which, aside from weight and inertia forces, the steering gear is subjected to no load or only slight load by transverse forces and bending moments. In this way, the mounting of the linear guide can be made particularly simple.

Here, the effective kinematics may change with the steering angle, because, in addition to the length of the steering drag link 310, there is also a variable spacing of the articulation of the steering drag link 310 to the center of rotation, fixed with respect to the frame, of the steering gear. The self-steering behavior during spring-compression movements can thus be dependent on whether steering is presently being performed to the left or to the right.

Figure 9:
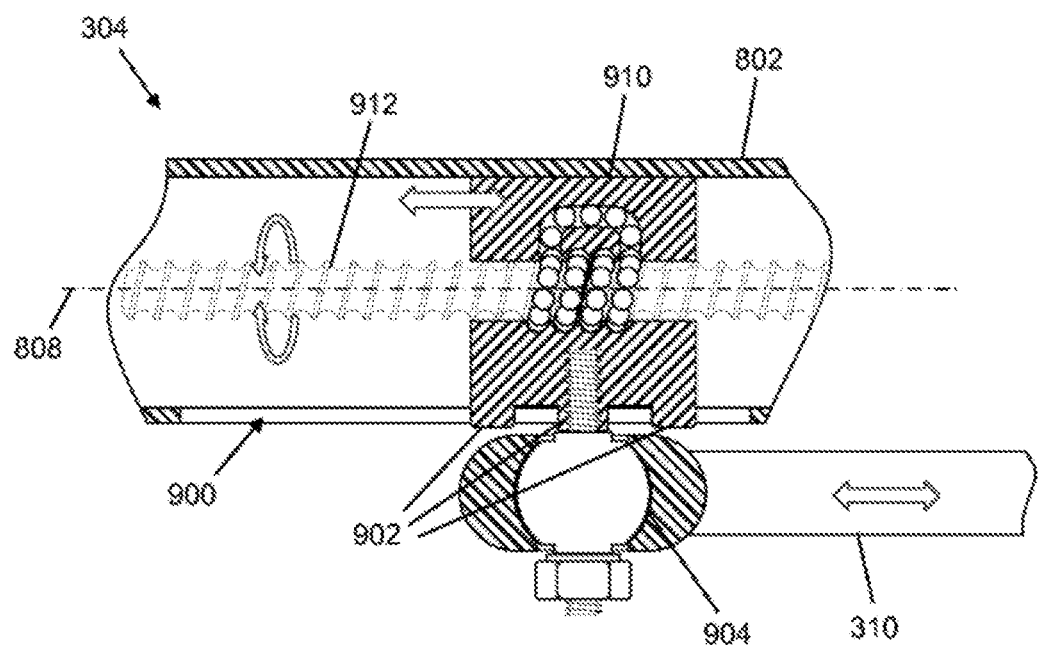
FIG. 9 is a schematic illustration of a linear drive as per an exemplary embodiment.

FIG. 9 is a schematic illustration of a linear drive 304 as per an exemplary embodiment. The linear drive 304 shown in FIG. 9 corresponds substantially to the linear drive described on the basis of FIG. 8, with the difference that the linear drive 304 shown in FIG. 9 has a spindle nut 910 which, by contrast to the spindle nut shown in FIG. 8, is not rotatable about the axis of rotation 808 but is arranged in the spindle drive housing 802 so as to be displaceable along the axis of rotation 808. The linear movement of the spindle nut 910 is effected by a rotation of the spindle 912 about the axis of rotation 808. For this purpose, the spindle 912 is for example coupled by the transmission gearing as per FIG. 7 to the steering column. In FIG. 9, the spindle nut 910 thus functions as displacement element.

The spindle drive housing 802 has an optional guide slot 900 for the guidance of the spindle nut 910 in the spindle drive housing 802. By way of example, the spindle nut 910 is formed with three guide pegs 902, which are mounted displaceably in the guide slot 900.

In this exemplary embodiment, the steering drag link 310 is arranged outside the spindle drive housing 802 and is connected in articulated fashion to the spindle nut 910 through the guide slot 900. The steering drag link 310 is screwed by way of a joint 904, in this case a ball joint, to a central one of the three guide pegs 902.

Thus, the steering drag link 310 is coupled pivotably by the joint 904 to the steering gear. Here, the steering gear may be connected fixedly to the frame of the vehicle.

The advantage of such an eccentric articulation of the steering drag link 310 consists in that a parallelogram formed by the steering drag link 310 and a longitudinal link of the vehicle has the same side length at any steering angle. Furthermore, the steering gear, by virtue of the fact that it is fixedly connected to the frame, forms part of the sprung mass of the vehicle.

Figure 10:
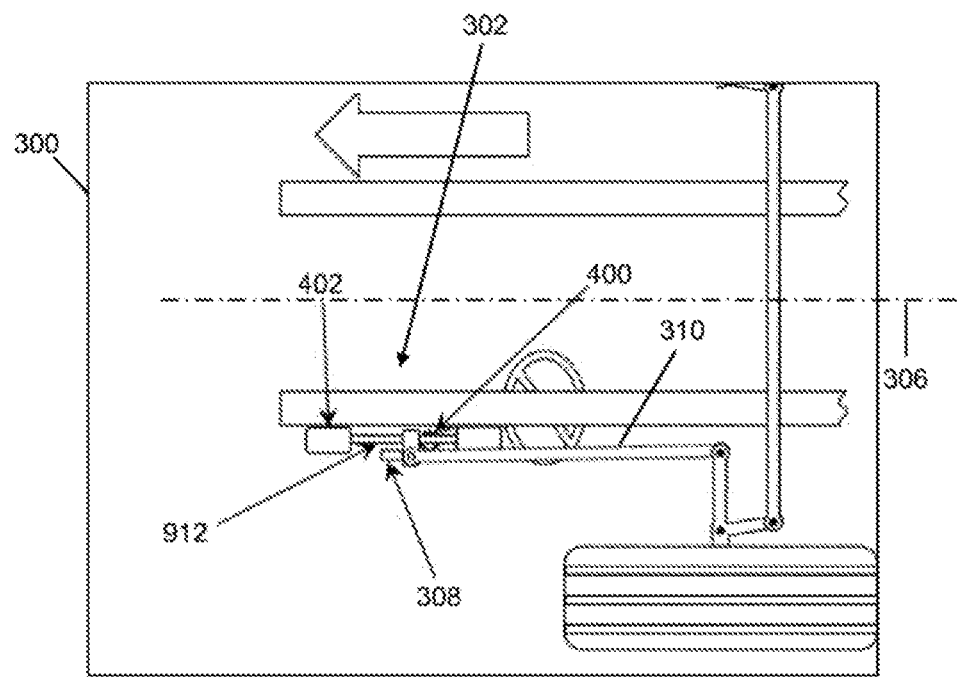
FIG. 10 is a schematic illustration of a section of a vehicle as per an exemplary embodiment.

FIG. 10 is a schematic illustration of a section of a vehicle 300 as per an exemplary embodiment. The vehicle 300 is for example a vehicle described above on the basis of FIGS. 3 to 9. In this exemplary embodiment, the steering gear 302 has a toothed rack 308 as displacement element 308, wherein the toothed rack 308 is formed so as to receive the spindle 912. Here, the toothed rack 308 functions as a recirculating ball nut, such that the toothed rack 308 is moved linearly, in this case substantially parallel to the vehicle longitudinal axis 306, as a result of a rotational movement of the spindle 912. The steering drag link 310 is fastened to the toothed rack 308.

In one exemplary embodiment, the input shaft of the steering column drives, by the pinion 400, the toothed rack 308, which is mechanically coupled to a rotating part of a spindle drive that moves the steering drag link 310. Optionally, the rotating part is coupled to the drive unit 402, for example an electric motor, in order to drive the rotating part.

Figure 11:
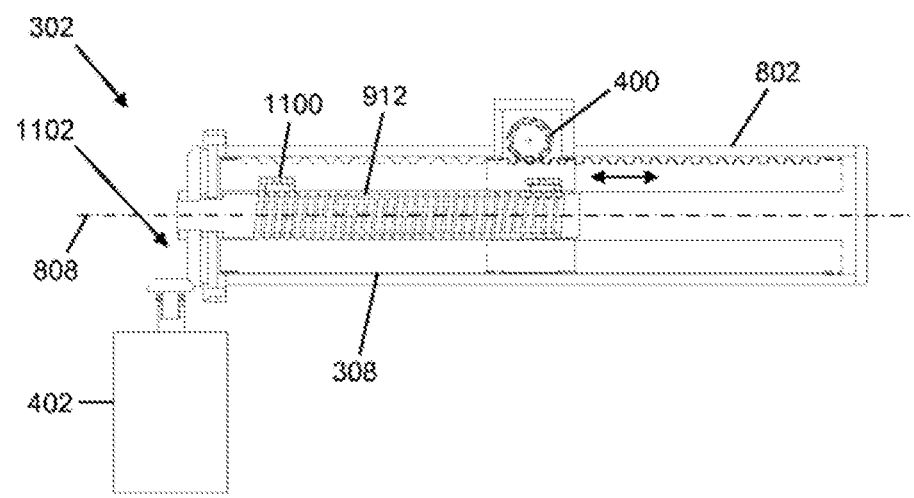
FIG. 11 is a schematic illustration of a steering gear from FIG. 10.

FIG. 11 is a schematic illustration of a steering gear 302 from FIG. 10. The illustration shows inter alia the displacement element 308 in the form of the toothed rack 308, the pinion 400 that engages into a toothing of the toothed rack 308, and the spindle 912 which is mounted rotatably in the toothed rack 308. The pinion 400, the toothed rack 308 and the spindle 912 are arranged in the spindle drive housing 802. The toothed rack 308 is realized with a ball return channel 1100 which is filled with balls and which is configured to effect a displacement of the toothed rack 308, and thus of the steering drag link, along the axis of rotation 808 as the spindle 912 rotates. The axis of rotation 808 may for example be oriented parallel to the vehicle longitudinal axis.

In this exemplary embodiment, the drive unit 402 is coupled by an optional spindle drive mechanism 1102, in this case a bevel-wheel gearing, to the spindle 912. Here, an end section, facing toward the spindle drive mechanism 1102, of the spindle 912 is mounted rotatably in the spindle drive housing 802.

Figure 12:
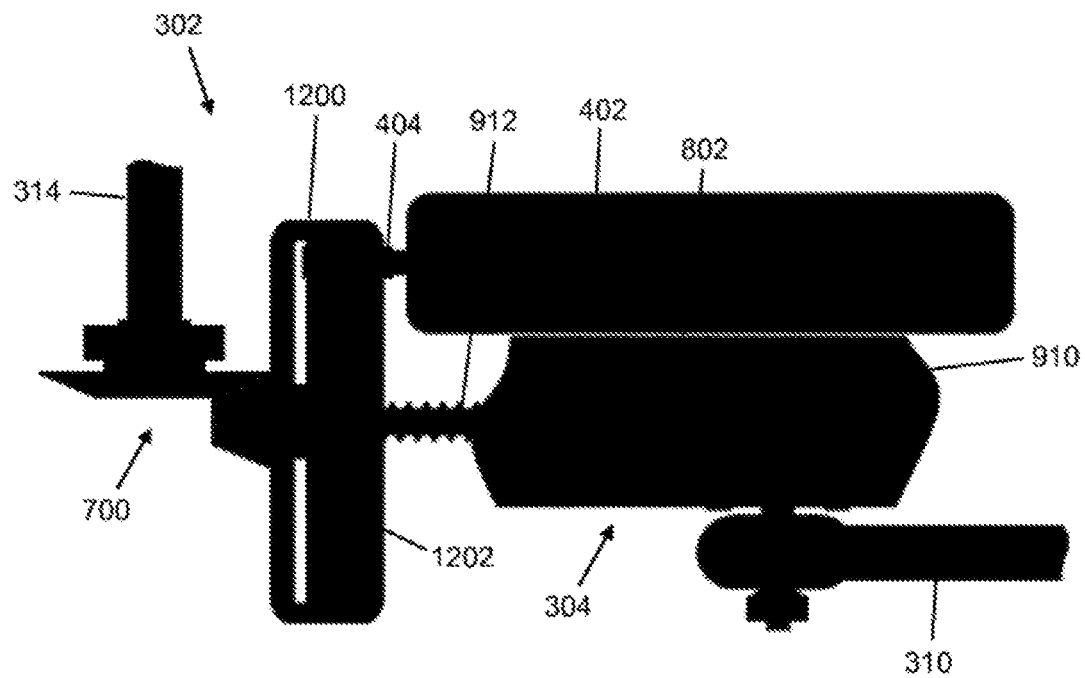
FIG. 12 is a schematic illustration of a steering gear as per an exemplary embodiment.

FIG. 12 is a schematic illustration of a steering gear 302 as per an exemplary embodiment. The steering gear 302 comprises a linear drive 304 as has been described above on the basis of FIG. 9. In this exemplary embodiment, there is seated on the spindle 912 an internally toothed wheel 1200 which is configured to drive the spindle 912. For this purpose, an internal toothing 1202 of the internally toothed wheel 1200 is coupled by the drive element 404 to the drive unit 402.

In this exemplary embodiment, the linear drive 304 is coupled by the transmission gearing 700, for example a bevel-wheel gearing described on the basis of FIG. 7, to the steering column 314.

Figure 13:
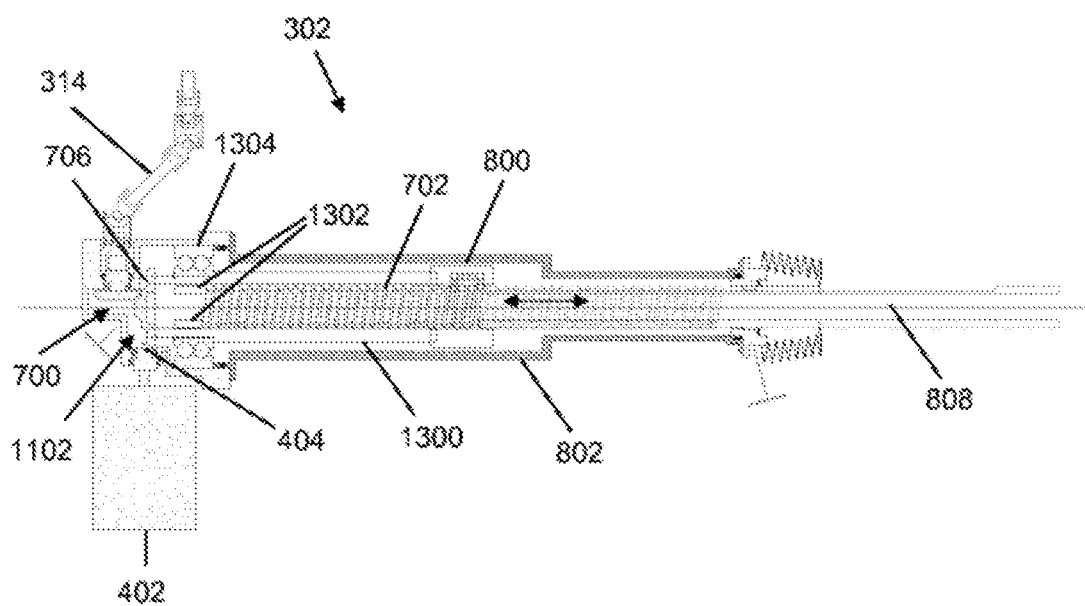
FIG. 13 is a schematic illustration of a steering gear as per an exemplary embodiment.

FIG. 13 is a schematic illustration of a steering gear 302 as per an exemplary embodiment. The steering gear 302 is for example a steering gear as described above on the basis of FIGS. 3 to 12. The steering gear 302 has a linear drive 304 similar to the linear drive described above on the basis of FIG. 8, in the case of which the steering drag link is fixed coaxially to the spindle 702.

In the exemplary embodiment shown in FIG. 13, the spindle 702 is arranged, so as to be displaceable along the axis of rotation 808, in a spindle sleeve 1300 which is rigidly connected to the spindle nut 800. For the guidance of the spindle 702 in the spindle sleeve 1300, it is for example the case that an end section, averted from the steering drag link, of the spindle 702 is formed with two spindle guide elements 1302, which engage into, and are displaceable in, corresponding spindle guide slots of the spindle sleeve 1300. The spindle sleeve 1300 is mounted in the spindle drive housing 802, so as to be rotatable about the axis of rotation 808, by a spindle sleeve bearing 1304, for example a two-road deep-groove ball bearing.

An output element, in this case by way of example the second bevel wheel 706 of the transmission gearing 700, is fastened to an end, averted from the steering drag link, of the spindle sleeve 1300. In this exemplary embodiment, the second bevel wheel 706 is of two-stage form in order to be driven firstly by the first bevel wheel 704 coupled to the steering column 314 and secondly by the drive element 404, likewise formed as a bevel wheel, of the drive unit 402. Here, a stage of the second bevel wheel 706 that is coupled to the drive element 404 has for example a greater number of teeth than the drive element 404.

By a rotational movement of the spindle sleeve 1300, and thus of the spindle nut 800, generated by the steering column 314 or the drive unit 402, the spindle 702, and thus the steering drag link fastened thereto, is displaced along the axis of rotation 808 in accordance with the direction of rotation.

Figure 14:
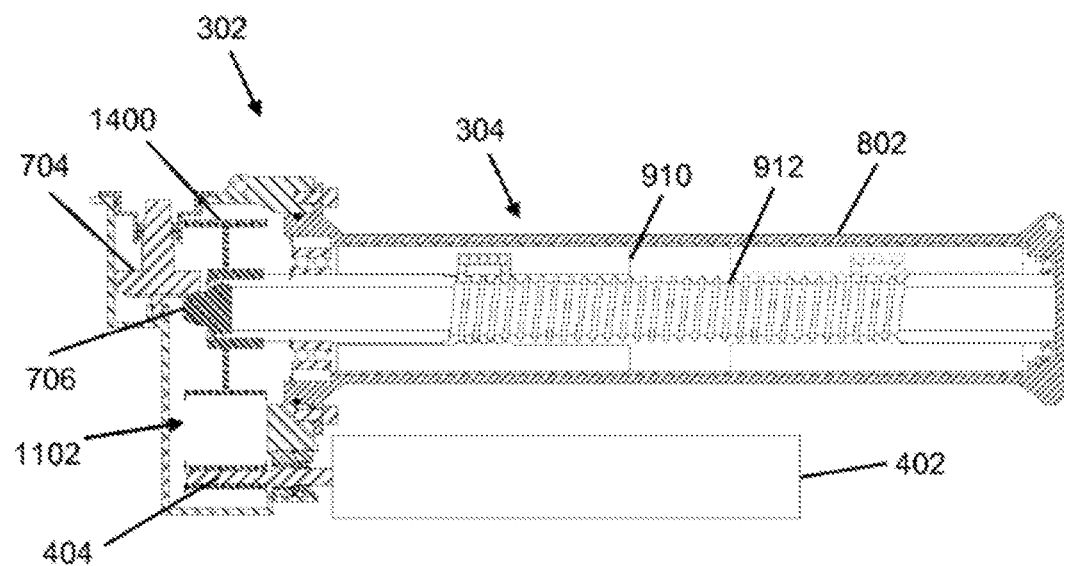
FIG. 14 is a schematic illustration of a steering gear as per an exemplary embodiment.

FIG. 14 is a schematic illustration of a steering gear 302 as per an exemplary embodiment. The linear drive 304 shown in FIG. 14 corresponds substantially to a linear drive with displaceable spindle nut 910, as described above on the basis of FIG. 9. In this exemplary embodiment, the spindle 912 is coupled to the drive unit 402 by a toothed-belt drive as spindle drive mechanism 1102. Here, it is for example the case that the second bevel wheel 706 is arranged coaxially with respect to a toothed-belt pulley 1400, seated on the spindle 912, of the spindle drive mechanism 1102.

Figure 15:
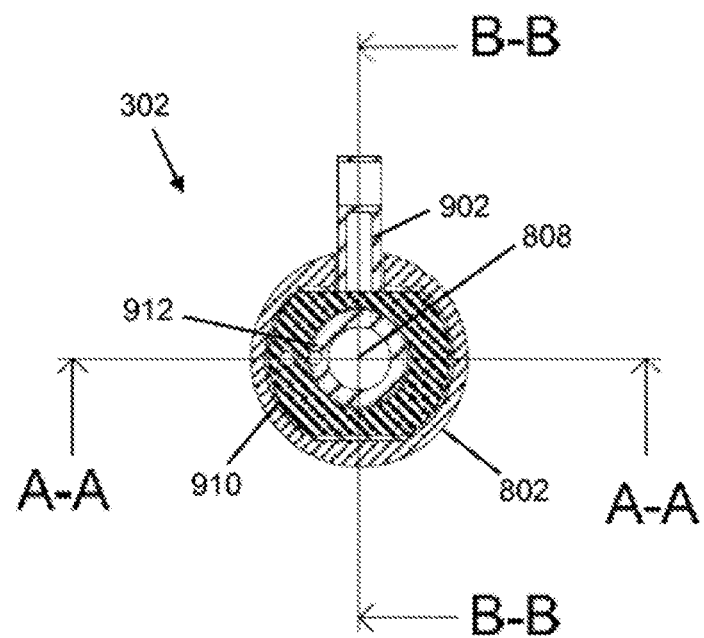
FIG. 15 is a schematic illustration of a cross section through a steering gear as per an exemplary embodiment.

FIG. 15 is a schematic illustration of a cross section through a steering gear 302 as per an exemplary embodiment. The steering gear 302 corresponds for example to a steering gear described above on the basis of FIG. 12. The figure shows a cross section through the steering gear 302 transversely with respect to the axis of rotation 808. As can be seen in FIG. 15, the spindle drive housing 802 is of a cylindrical configuration. Here, an inner wall surface of the spindle drive housing 802 has two mutually oppositely situated curved sections and two mutually oppositely situated straight sections. The spindle nut 910 has, on the sides facing the straight sections, in each case one corresponding flattened portion, and on the sides facing the curved sections, in each case one corresponding rounded portion. The guide peg 902 for the articulation of the steering drag link is also illustrated.

Figure 16:
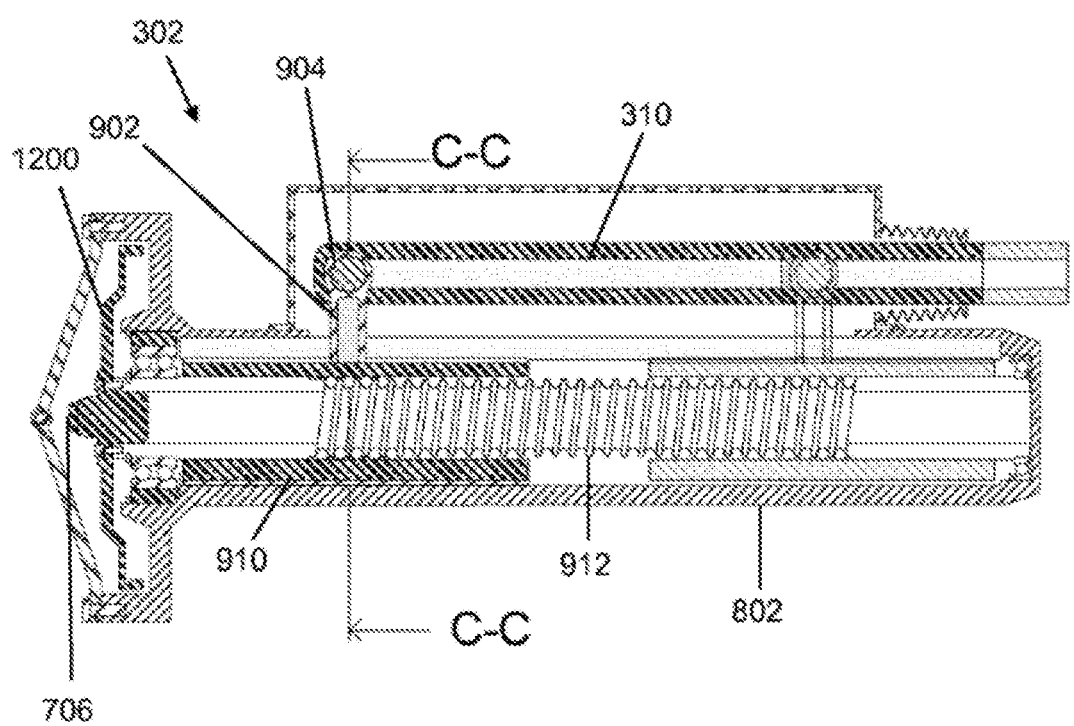
FIG. 16 is a schematic illustration of a cross section through a steering gear from FIG. 14.

FIG. 16 is a schematic illustration of a cross section through a steering gear 302 from FIG. 14. By contrast to FIG. 14, however, the drive is realized by an internally toothed wheel gearing as in FIG. 12. The figure shows a cross section along a section line B-B shown in FIG. 15. The cross section shown in FIG. 15 corresponds here to a cross section along a section line C-C shown in FIG. 16.

Figure 17:
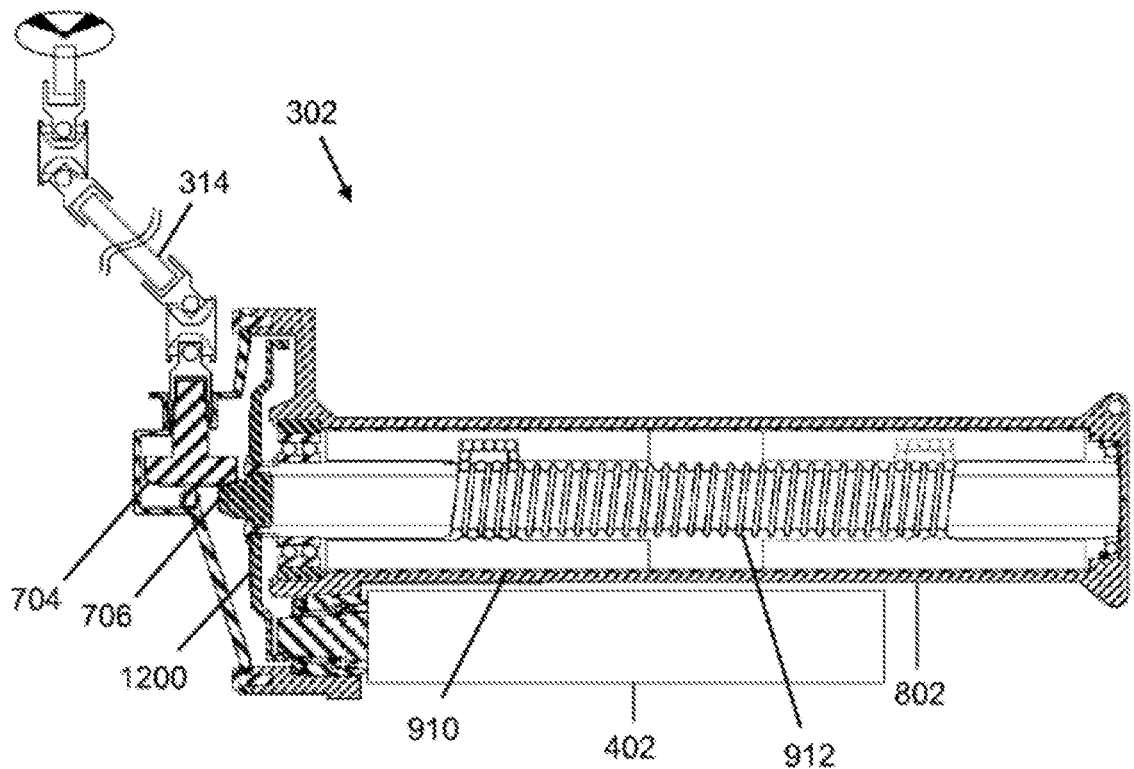
FIG. 17 is a schematic illustration of a cross section through a steering gear.

FIG. 17 is a schematic illustration of a cross section through a steering gear 302 from FIG. 16. The figure shows a cross section along a section line A-A shown in FIG. 15.

Exemplary embodiments of the present invention will be described by way of example once again below on the basis of the preceding figures.

In one exemplary embodiment, the spindle drive is connected to the steering column 314 and to at least one electric motor as a drive unit 402 for servo assistance.

Here, the steering drag link may, depending on the exemplary embodiment, be connected to the spindle 702 or to the spindle nut 910.

The transmission of the moment from the drive unit 402 to the spindle 702 or spindle nut 910 is realized for example by a toothed belt. This offers the advantage of a low level of noise generation, and a small amount of play. Here, it is also possible for multiple toothed belts to be used for the transmission of force.

A coupling by a spur-wheel gearing is also conceivable. A spur-wheel gearing of said type offers the advantage of a high level of robustness and low production costs.

Furthermore, the coupling may be realized by an internally toothed wheel, as shown for example in FIGS. 16 and 17. In this way, a higher transmission ratio is made possible in the same structural space. Furthermore, a greater number of teeth are in engagement, whereby noises and vibrations are reduced, and less wear occurs in relation to an external toothing.

A direct drive of the spindle 702 or of the spindle nut 910 is also possible. In this way, no teeth are in engagement, such that noises and play and wear, in particular in the case of a slight undulation of an engine torque, can be reduced to a minimum.

An exemplary embodiment is particularly expedient in which the steering drag link is coupled pivotably to the spindle nut 910 by the joint 904, wherein the steering column 314 drives the spindle 702 via a single-stage bevel-wheel gearing, and the drive unit 402 drives the spindle 702 via a single-stage internally toothed wheel gearing.

Figure 18:
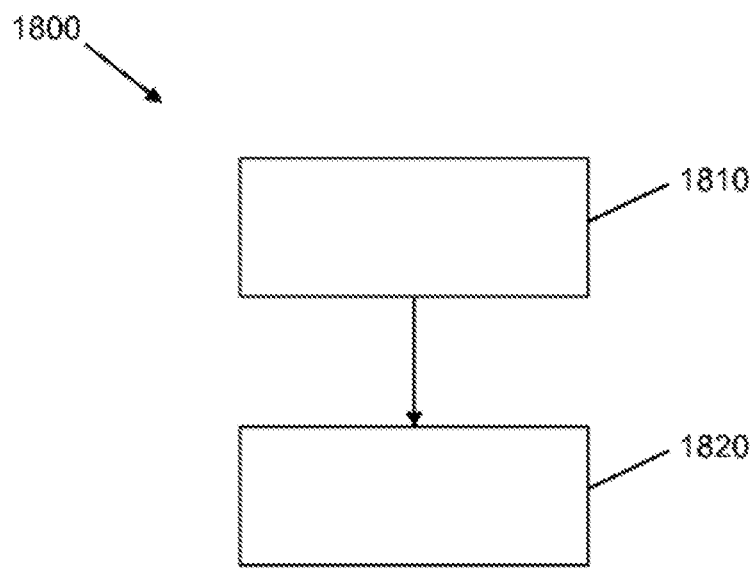
FIG. 18 shows a flow diagram of a method for actuating a steering gear as per an exemplary embodiment.

FIG. 18 shows a flow diagram of a method 1800 for actuating a steering gear as per an exemplary embodiment. The method 1800 may for example be carried out in conjunction with a steering gear described above on the basis of FIGS. 3 to 17. Here, in a step 1810, a steering signal that represents a steering movement is read in. In a further step 1820, a control signal for controlling a drive unit for driving the displacement element is provided using the steering signal.

Figure 19:
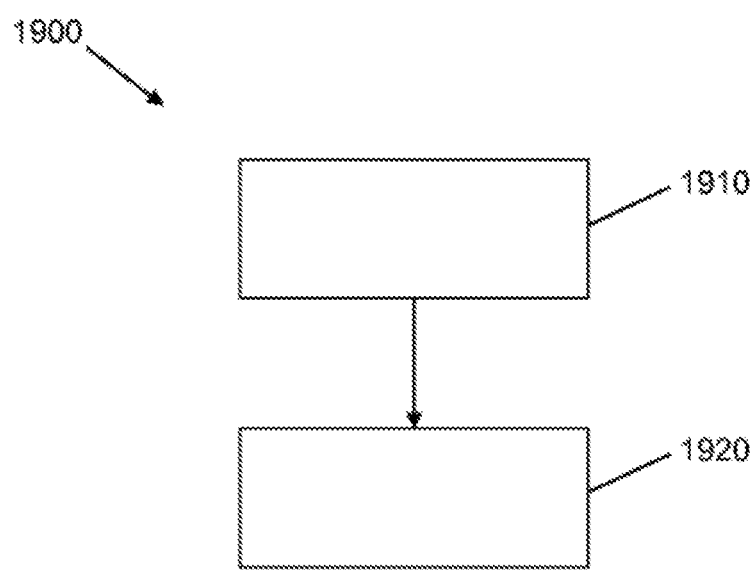
FIG. 19 shows a flow diagram of a method for steering a vehicle as per an exemplary embodiment.

FIG. 19 shows a flow diagram of a method 1900 for steering a vehicle as per an exemplary embodiment. The method 1900 may for example be carried out in conjunction with a vehicle described above on the basis of FIGS. 3 to 18. In a step 1910, a steering torque is coupled into the steering gear of the vehicle via the steering column of the vehicle. In a step 1920, the steering moment is converted by the linear drive of the steering gear into a movement of the displacement element of the linear drive along the vehicle longitudinal axis.

If an exemplary embodiment comprises an "and/or" combination between a first feature and a second feature, this is to be read as meaning that the exemplary embodiment has, in one embodiment, both the first feature and the second feature and, in a further embodiment, either only the first feature or only the second feature.

THE LIST OF REFERENCE DESIGNATIONS IS AS FOLLOWS

100 Steering gear
101 Spindle
102 Input shaft
104 External toothing
106 Recirculating ball nut
108 Output shaft
110 Segmented toothing
112 Steering pitman arm
114 Steering drag link
200 Vehicle
202 Steering lever
204 Wheel
206 Further wheel
208 Knuckle arm
210 Tie rod
212 Vehicle frame
300 Vehicle
302 Steering gear
304 Linear drive
306 Vehicle longitudinal axis
308 Displacement element
310 Steering drag link
312 Wheel
314 Steering column
400 Pinion
402 Drive unit
404 Drive element
406 Frame
500 Further drive unit
502 Further drive element
600 First toothing side
602 Second toothing side
700 Transmission gearing
702 Spindle
704 First bevel wheel
706 Second bevel wheel
800 Spindle nut
802 Spindle drive housing
804 Spindle nut bearing
806 Stop
808 Axis of rotation
810 Guide element
812 Housing opening
900 Guide slot
902 Guide peg
904 Joint
910 Spindle nut
912 Spindle
1100 Ball return channel
1102 Spindle drive mechanism
1200 Internally toothed wheel
1202 Internal toothing
1300 Spindle sleeve
1302 Spindle guide element 1304 Spindle sleeve bearing
1400 Toothed-belt pulley
1800 Method for actuating a steering gear
1810 Reading-in step
1820 Provision step
1900 Method for steering a vehicle
1910 Coupling-in step
1920 Conversion step

The invention claimed is:

1. A steering gear for a vehicle, comprising:
an input shaft having a spindle section;
a recirculating ball nut, adjacent the spidle section, and having an external toothing;
an output shaft having a segmented toothing arranged rotationally conjointly thereon, the segmented toothing meshing with the external toothing;
a steering arm connected rotationally conjointly to the output shaft and movably connected to a steering drag link; and
a linear drive having at least one displacement element, which is displaceable substantially along a vehicle longitudinal axis of the vehicle and which is fastenable to the steering drag link of the vehicle;
wherein the linear drive is configured to convert a rotational movement of a steering column of the vehicle into a movement of the displacement element substantially along the vehicle longitudinal axis.

2. The steering gear of claim 1, wherein the linear drive includes a toothed-rack drive with a toothed rack as displacement element or a ball screw drive with a spindle and/or a spindle nut as the displacement element.

3. The steering gear of claim 1, wherein the linear drive includes a toothed-rack drive with a toothed rack as displacement element, and wherein the toothed rack is formed to receive a spindle and to be displaced substantially along the vehicle longitudinal axis as a result of a rotational movement of the spindle.

4. The steering gear of claim 2, further comprising:
a transmission gearing for converting the rotational movement of the steering column into a rotational movement of the spindle or of the spindle nut.

5. The steering gear of claim 4, wherein the transmission gearing includes a spur-wheel gearing or a bevel-wheel gearing.

6. The steering gear of claim 1, further comprising:
at least one drive unit for driving the displacement element.

7. The steering gear of claim 6, wherein the drive unit and the displacement element are coupled to one another by at least one toothed belt and/or one spur wheel and/or one internally-toothed wheel.

8. The steering gear of claim 1, further comprising:
the steering drag link.

9. The steering gear of claim 8, wherein the steering drag link and the displacement element are arranged coaxially with respect to one another, and wherein the steering drag link and the displacement element are rigidly connected to one another.

10. The steering gear of claim 8, wherein the steering drag link is connected pivotably to the displacement element by a joint.

11. A vehicle, comprising:
a steering column, which is an input shaft:
a steering drag link; and
a steering gear, which is coupled to the steering column and to the steering drag link;
wherein the steering gear includes the input shaft, which has a spindle section; a recirculating ball nut, adjacent the spidle section, and having an external toothing; an output shaft having a segmented toothing arranged rotationally conjointly thereon, the segmented toothing meshing with the external toothing; a steering arm connected rotationally conjointly to the output shaft and movably connected to the steering drag link,
wherein the steering gear includes a linear drive having at least one displacement element, which is displaceable substantially along a vehicle longitudinal axis of the vehicle and which is fastenable to the steering drag link of the vehicle, and
wherein the linear drive is configured to convert a rotational movement of the steering column of the vehicle into a movement of the displacement element substantially along the vehicle longitudinal axis.

12. The vehicle of claim 11, wherein the steering gear is on a frame of the vehicle.

13. The vehicle of claim 11, wherein longitudinal links of a front axle and the steering drag link are of approximately equal length and arranged substantially parallel to one another so as to form a parallelogram, and wherein the steering drag link is arranged to span the parallelogram during the displacement of the displacement element.

14. A method for actuating a steering gear, the method comprising:
reading in a steering signal that represents a steering movement; and
providing a control signal for controlling a drive unit for driving at least one displacement element using the steering signal;
wherein the steering gear includes the input shaft, which has a spindle section; a recirculating ball nut, adjacent the spidle section, and having an external toothing; an output shaft having a segmented toothing arranged rotationally conjointly thereon, the segmented toothing meshing with the external toothing; a steering arm connected rotationally conjointly to the output shaft and movably connected to the steering drag link,
wherein the steering gear includes a linear drive having the at least one displacement element, which is displaceable substantially along a vehicle longitudinal axis of the vehicle and which is fastenable to the steering drag link of the vehicle, and
wherein the linear drive is configured to convert a rotational movement of the steering column of the vehicle into a movement of the displacement element substantially along the vehicle longitudinal axis.

15. A method for steering a vehicle, the method comprising:
coupling a steering moment into the steering gear via a steering column, which is an input shaft, wherein the vehicle includes the steering column, a steering drag link and a steering gear coupled to the steering column and to the steering drag link, wherein the steering gear has a linear drive with at least one displacement element which is displaceable substantially along a vehicle longitudinal axis of the vehicle and which is fastenable to the steering drag link; and
converting the steering moment into a movement of the displacement element substantially along the vehicle longitudinal axis by the linear drive;
wherein the steering gear includes the input shaft, which has a spindle section; a recirculating ball nut, adjacent the spidle section, and having an external toothing; an output shaft having a segmented toothing arranged rotationally conjointly thereon, the segmented toothing meshing with the external toothing; a steering arm connected rotationally conjointly to the output shaft and movably connected to the steering drag link.

* * * * *